United States Patent [19]

Dimich

[11] Patent Number: 4,583,322

[45] Date of Patent: Apr. 22, 1986

[54] ORNAMENTAL CONTAINER AND DISPLAY ASSEMBLY FOR A SEEDLING PLANT

[76] Inventor: Robert A. Dimich, 4160 Hardie Rd., Coconut Grove, Fla. 33133

[21] Appl. No.: 681,813

[22] Filed: Dec. 14, 1984

[51] Int. Cl.[4] ............................................. A01G 9/02
[52] U.S. Cl. ........................................... 47/66; 47/72
[58] Field of Search .................. 47/66, 72, 55, 33, 11, 47/82, 83; D11/1, 121; 428/3, 7, 19, 23, 28; 248/221.3; 24/336

[56] References Cited

U.S. PATENT DOCUMENTS

| | | | |
|---|---|---|---|
| D. 98,549 | 2/1936 | Sharp | 47/41 |
| 1,801,281 | 11/1929 | McEldowney | 47/41 |
| 2,313,378 | 3/1943 | Wolf | D11/124 |
| 3,261,494 | 7/1966 | Walker | 428/3 |
| 4,077,159 | 3/1978 | Haglund | 47/66 |
| 4,196,542 | 4/1980 | West | 47/66 |
| 4,317,311 | 3/1982 | Schmitt | 47/66 |

Primary Examiner—Robert E. Bagwill
Assistant Examiner—Bradley M. Lewis
Attorney, Agent, or Firm—John C. Malloy

[57] ABSTRACT

An assembly for holding and removably mounting a live seedling plant, preferably a containerized seedling, on either a live or an artificial tree, such as a Christmas Tree or the like, in combination with an additional decorating structure of the type typically associated with a Christmas Tree or seasonal ornamentation. The assembly includes an elongated compartment of sufficient longitudinal dimension to maintain growth media therein and thereby allow the root system of the seedling to grow in a preferred vertically downward and elongated configuration of sufficient length to facilitate growth of the seedling. The live plant is thereby combined in a decorative manner with a live or an artifical tree structure and can readily be removed therefrom after the live or artificial tree has been used.

16 Claims, 12 Drawing Figures

U.S. Patent  Apr. 22, 1986  Sheet 1 of 3  4,583,322
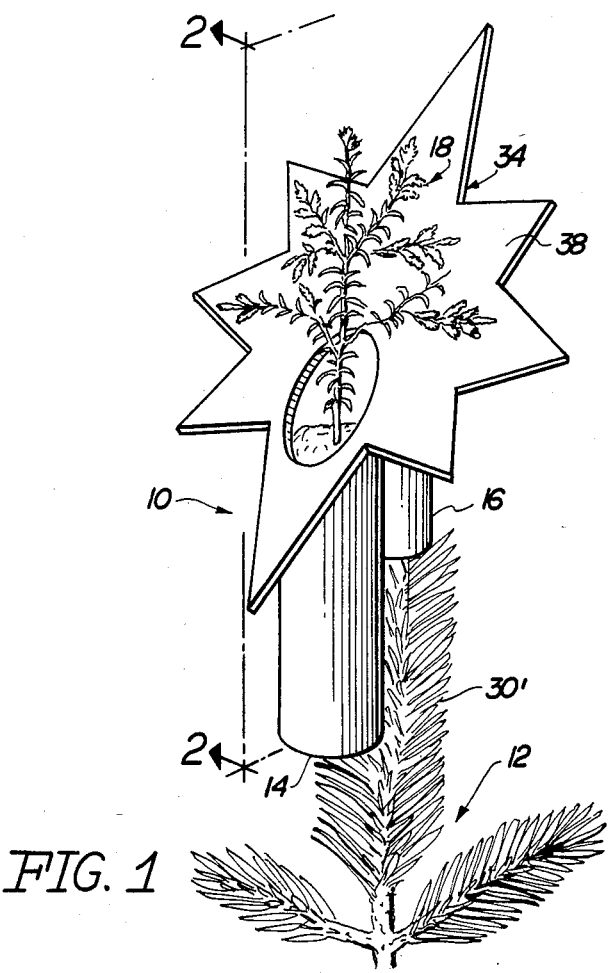
FIG. 1
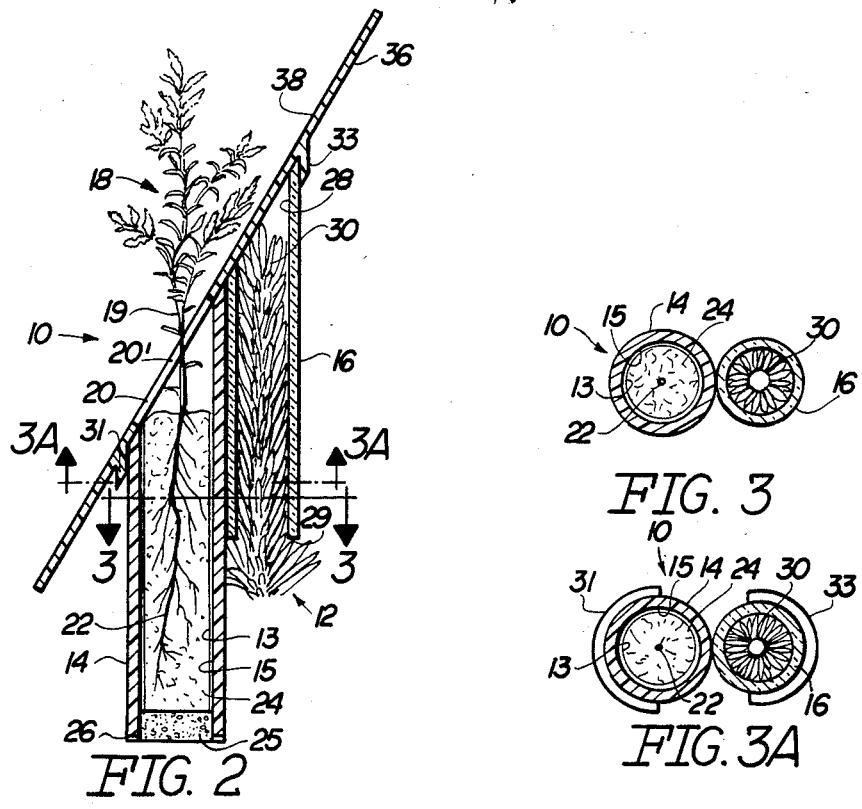
FIG. 2
FIG. 3
FIG. 3A U.S. Patent   Apr. 22, 1986   Sheet 2 of 3   4,583,322

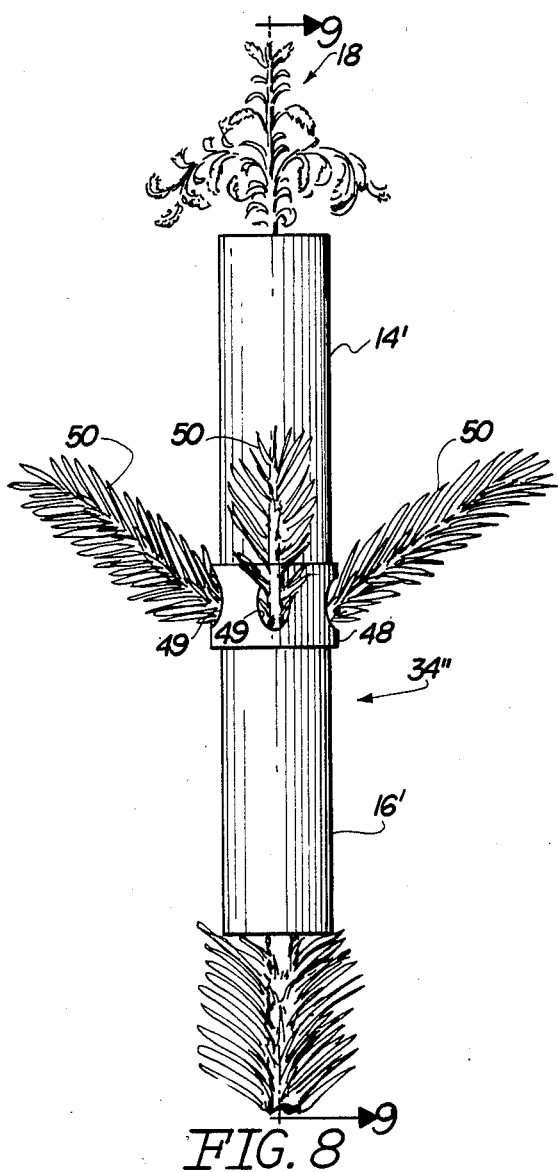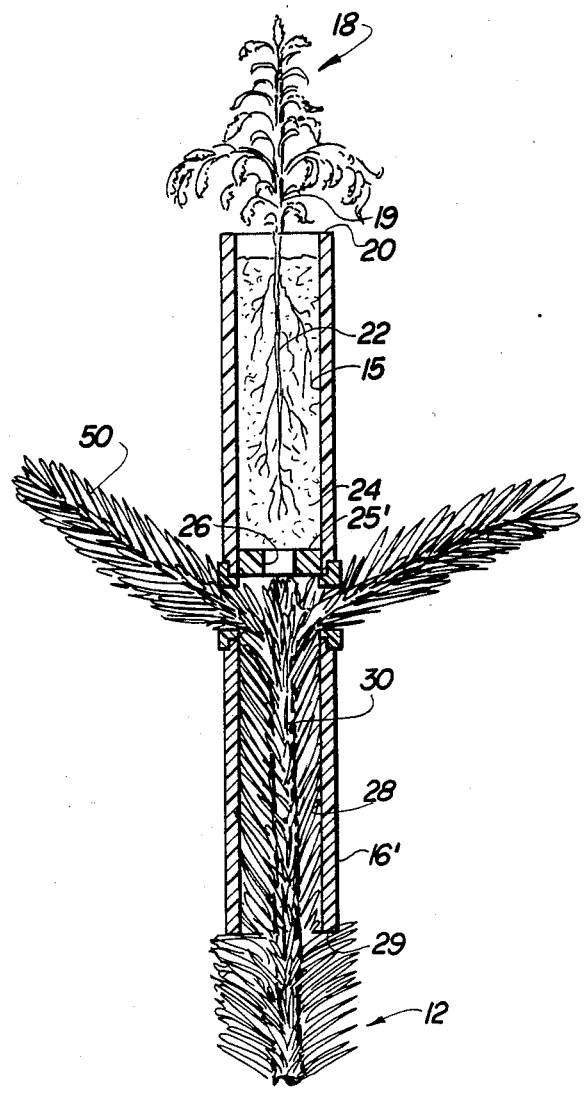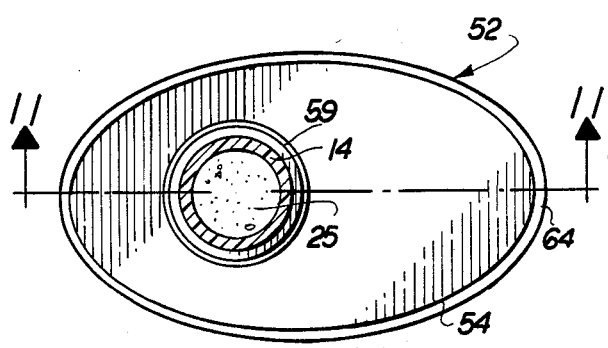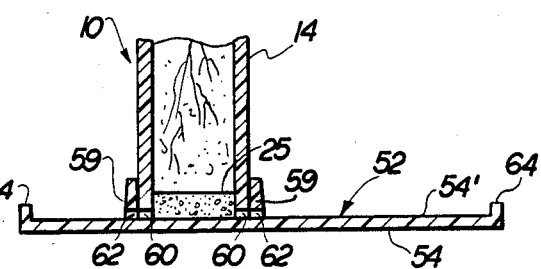

ORNAMENTAL CONTAINER AND DISPLAY ASSEMBLY FOR A SEEDLING PLANT

BACKGROUND OF THE INVENTION

1. Field of the Invention

An adapter assembly used to mount a seedling plant and preferably a live container grown seedling with or without a more conventional decoration on either an artificial or live tree such as a Christmas Tree wherein facilities for containing the seedling are particularly structured to foster growth and improve chances of survival for container grown seedlings and like plants when transplanted from the adapter assembly.

2. Description of the Prior Art

The utilization and popularity of artificial Christmas Tree structures has been known for many years. Generally, such structures have the advantage of durability and may be used continuously for many years. Also, use of such artificial tree structures do not entail the care and maintenance frequently associated with live or fresh cut trees. In addition, artificial trees are generally considered to be safer than fresh cut trees especially by being less flammable, thereby preventing fire.

However, the use of live Christmas trees and the like are still greatly preferred by many. Such preference is generally associated with the time honored tradition of maintaining, for at least a short period of time, a live tree and then transplanting or replanting the tree in some permanent location outside of the home. Obvious disadvantages are associated with such tradition. Such disadvantages are usually associated with the removal and maintenance of the rather cumbersome root system of the tree and then the transporting and replanting of such tree including the root system in a manner which will facilitate permanent growth of the live tree at its new location.

Based on the above, there is an obvious advantage of combining an adaptor assembly capable of maintaining a seedling or plant, preferably of the container grown type, in a manner which allows mounting and display of the container grown seedling on a seasonal tree such as a Christmas tree. Whether the seasonal tree is artificial or real, the seedling itself can be maintained on a permanent basis by replanting after use in order to have a lasting memory of the particular season for which the tree was utilized. Various prior art attempts have been made to provide holders for live and/or artificial plants.

Prior art structures of the type set forth above are generally represented in the following U.S. Pat. Nos.: Hamlet, 2,453,906; Ehlers, 2,691,849; Teufel, 3,044,200; Zumpel et al, 3,498,520; O'Connell, 4,004,367; and Koistinen, 4,418,496.

While the structures disclosed in the above-noted patents are certainly operable for the function intended, none are specifically directed to or disclose structures which serve to combine a live plant, preferably a container grown seedling, with either a live or an artificial tree in a decorative fashion. Further, both growth and transplanting of the seedling is facilitated by the particular structure of components of a preferred container and mounting assembly.

SUMMARY OF THE INVENTION

The present invention relates to a combined container and mounting assembly primarily designed for maintaining a live container grown seedling and removably supporting the seedling in an exposed position for decoration of a Christmas Tree or like structure. Further, the seedling is so mounted, by virtue of the structure of the subject assembly, that it is displayed in an aesthetically pleasing manner and in combination with a more conventional decorative type component such as a star, angel, etc.

The container and mounting assembly of the present invention comprises a container compartment having an elongated configuration and being opened at one end so as to allow growth and outward extension from the compartment of the exposed part of the seedling. The root system of the seedling is maintained in engagement with a growth media which is contained within the compartment of the container. Further, the compartment and more specifically the interior thereof is specifically configured and dimensioned to accommodate the elongated and downwardly extending root system normally associated with certain plant or tree seedlings such as a Fir, Cedar, or Spruce trees. Generally, seedlings of the type which are container grown flourish best and have their chances of survival after transplant greatly increased when the root system is allowed to grow in an appropriate growth medium in a substantially downward elongated configuration. Further, such root system is known to be relatively lengthy and any container in which such root system grows should be of sufficient length and overall dimension to eliminate crowding and prevent an "upturn" of the root system. Nursery containers for raising such seedlings are typically and ideally designed to facilitate such elongated vertically extending root systems as set forth in the subject assembly. The structure of the present adaptor assembly is designed especially and ideally but not exclusively so as to utilize seedlings grown in such nursery containers.

The subject assembly comprises a housing which incorporates the container means and compartment for containment of the seedling. The housing further includes a mounting means in the form of an elongated tubular structure disposed adjacent to the container compartment exteriorly thereof. The mounting means includes a substantially elongated hollow interior portion having at least one end opened wherein the open end and elongated hollow interior is specifically configured and dimensioned to surround, in substantially telescoping fashion, a distal end or tip of a branch or trunk portion of the supporting tree. The housing as well as the entire assembly is thereby removably mounted or positioned preferably on a distal end of the trunk portion of the tree. Such placement is generally associated with conventional decorative structures such as the traditional star or angel which tops a Christmas Tree.

In order to further add to the aesthetic appearance of the subject assembly, a decorating means, which may take a variety of designs and configurations, is removably connected to the exterior of the housing. The decorative structure is configured and oriented in cooperating relation to the seedling so that the seedling and the decorative structure can be displayed in combination with one another and in a manner which emphasizes the utilization of a live plant, in the form of the seedling, on an artificial or live seasonal tree.

It is apparent that the subject container and mounting assembly can be used to carry and display the seedling separately from an artificial tree, in and of itself, or if desired, on a real tree.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the nature of the present invention, reference should be had to the following detailed description taken in connection with the accompanying drawings in which:

FIG. 1 is an isometric view of the assembly of the present invention mounted on a tree structure.

FIG. 2 is a sectional view along line 2—2 of FIG. 1.

FIGS. 3 and 3A are sectional views along lines 3—3 and 3A—3A respectively of FIG. 2.

FIG. 8 is a front elevational view of yet another embodiment of the present invention wherein branch replica structures serve as decorational additions to the housing of the assembly of the present invention.

FIG. 9 is a sectional view taken along line 9—9 of FIG. 8.

FIG. 10 is a top plan view of a stand or support structure for the assembly when not mounted on an artificial or live tree.

FIG. 11 is a sectional view of the embodiment of FIG. 10.

Like reference numerals refer to like parts throughout the several views of the drawings.

DETAILED DESCRIPTION OF THE PREFERRED EMBODIMENT

Figure 4:
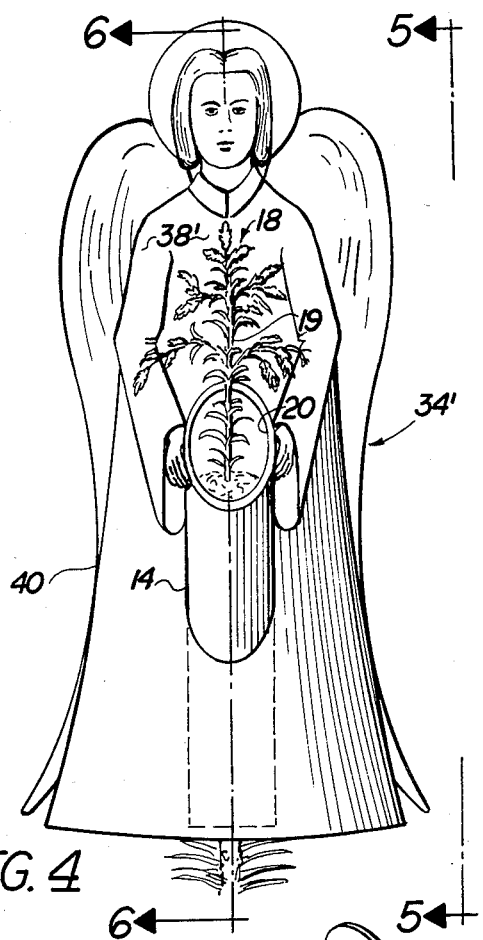
FIG. 4 is a front elevational view of another embodiment of the present invention also mounted on a tree structure.
Figure 5:
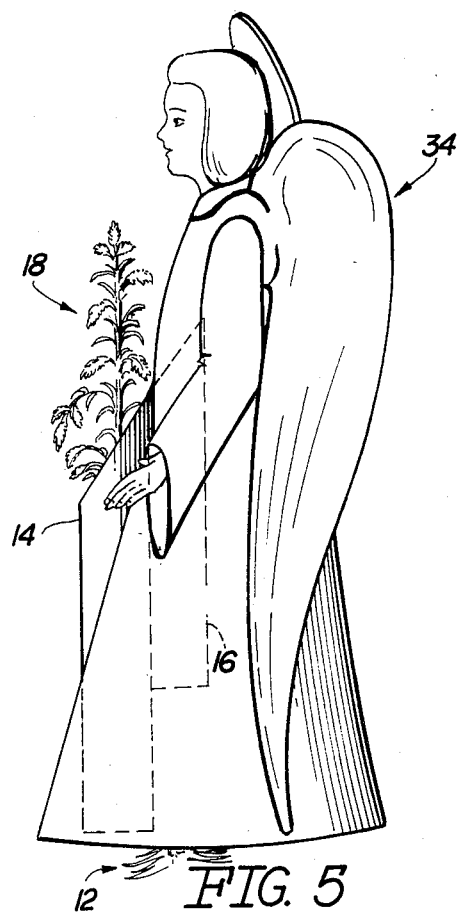
FIG. 5 is a side elevational view of the embodiment of FIG. 4 taken along line 5—5 thereof.

As shown in FIG. 1, the present invention is directed towards a container and mounting assembly generally indicated as 10 of the type specifically structured to be removably mounted on a tree structure 12. As set forth hereinafter, the tree structure 12 is either a live tree or of the artificial type utilized for seasonal or holiday display.

In the embodiment of FIGS. 1, 2 and 3, the assembly 10 includes a housing comprising container means 14 and adjacently positioned and fixedly secured mounting means 16. The container means 14 has an elongated configuration and includes an interior compartment 15 extending along the length thereof and specifically dimensioned and configured to house or support a seedling type plant generally indicated as 18 therein. The seedling includes an outwardly extending portion 19 projecting from the compartment 15 through a first opening 20. However, the root system 22 of the seedling 18 extends downwardly into a growth media 24 used to nourish and/or support the root system 22. As shown in FIG. 2, the growth media may be at least partially enclosed or surrounded by a sleeve or cover 13 formed from a papar or like material. The sleeve 13 serves to effectively contain the growth media as well as the root system 22 of the seedling and thereby facilitate transfer of the seedling, growth media and root system into and out of the compartment means 14 without damaging or destroying the root system or dispersing the growth media 24. For purposes of clarity, the sleeve 13 is represented only in FIG. 2. However, it should be noted that such a sleeve may well be used to contain the growth media in any of the embodiments shown in the present invention. The seedlng 18 is live and may be of the Cedar, Fir, Spruce, or Evergreen type or other type tree or plant specifically and preferably wherein the root system 22 has an elongated vertically extending root system. It is well recognized that growth of this container grown type of seedling 18 flourishes and transplanting is best accomplished when the root system 22 thereof is allowed to grow in a substantially vertically downward extension and the roots are prevented from turning upward. Accordingly, the longitudinal dimension of the compartment 15 is such as to provide sufficient room for an elongated root system 22 to grow in a vertically downward direction as shown in FIG. 2. A plug or stopper element 25 may be provided in the opposite end of container means 14 relative to first opening 20 in order to facilitate maintenance of the growth media 24 within the compartment 15. The plug 25 is preferably made of a porous, liquid permeable material to allow drainage of excess water from the growth media 24. Alternately, as will be explained in greater detail with specific reference to FIG. 9, a plug element 25' may be structured to include a drain or venting aperture 26 through which excess liquid may pass.

Preferably, the mounting means 16 of the present invention also has an elongated configuration and a hollow interior portion 28 communicating with the exterior of the mounting means 16 through a second opening 29. The opening 29 as well as the interior portion 28 is specifically dimensioned and configured to be telescoped about and receive a distal end 30 of a trunk portion of the tree structure 12. This distal end 30 may represent the upper extremity or tip of the uppermost branch as at 30' (see FIG. 1). The assembly 10 is positioned on the tree structure 12 in the traditional location such as a star or angel on the top of a Christmas Tree.

Figure 6:
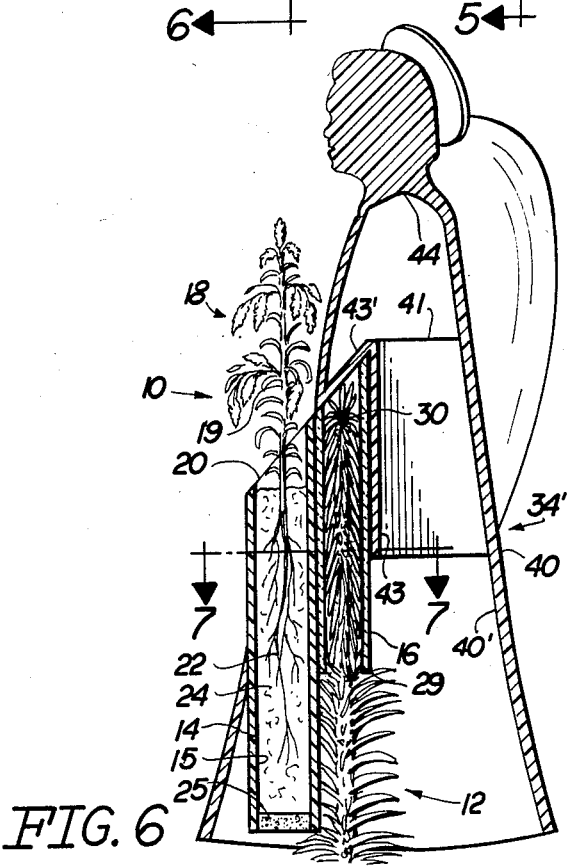
FIG. 6 is a sectional view taken along line 6—6 wherein relative dispositions of the seedling, its root system and a trunk portion of the tree on which the assembly is mounted are clearly displayed.
Figure 7:
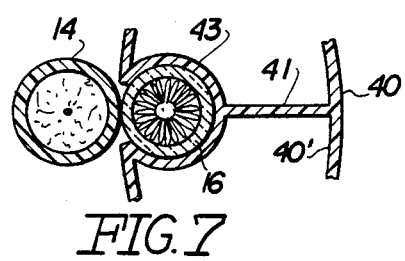
FIG. 7 is a sectional view along line 7—7 of FIG. 6.

Again with reference to the embodiments of FIGS. 1, 2 and 3, the container means 14 is fixedly secured to the mounting means 16 in immediately adjacent and substantially parallel relation thereto as best shown in FIGS. 1 and 2. Further, a decorating means generally indicated as 34 is provided in the form of a star 36 having a substantially planar configuration as best shown in FIG. 2. The exposed or display face 38 of star 36 is substantially angularly oriented relative to the longitudinal axis of the container means 14 as well as the mounting means 16. The first opening 20 is defined by its periphery 20' being disposed coplanar to the star 36 such that the seedling is allowed to project therethrough and be disposed in substantially aligned and combined relation to the exposed surface 38 and this embodiment, in front thereof. A combined display with the decorating means 34 is thereby provided. With primary reference to FIGS. 2 and 3A, it is seen that the decorating means 34 is removably secured in its angularly oriented relation to the top of both container means 14 and mounting means 16 through the provision of substantially semi-circular clip elements 31 and 33 embracing the upper and outer peripheral edges (see FIG. 3A) of the container means 14 and mounting means 16 respectively. Removable attachment is thereby provided for ease of replacement of the decorating means 34 as when a different display or configuration is desired. The decorating means 34' or angel 40 is removably attached to the top portion of the mounting means 16 by means of sleeve structure 43 slidingly engaging in telescoping relation the top and exterior surface portions of the mounting means 16 as shown in both FIGS. 6 and 7. The sleeve 43 includes a top portion 43' serving to cover the upper opening of the mounting means. In addition, a flange element 41 serves to integrally connect the interior surface as at 40' with the sleeve 43 in the manner demonstrated. As with the embodiment of FIG. 1, the seedling 18 including the exposed portion 19, extends outwardly from the first opening 20 formed in one end of the container means 14 and projects upwardly into aligned and substantially combined relation with an exposed display surface 38' of the decorative angel 40 of the decorating means 34'. Accordingly, the assembly 10 allows the display of a live plant or seedling 18 in combination with what may be a live or an artificial tree structure 12 wherein the display seedling 18 is combined with the decorating means 34 being in the embodiment of a star 36 in FIGS. 1 and 2.

With regard to FIGS. 4 through 7, the housing of the assembly 10 similarly comprises the container means 14 and the mounting means 16 being attached in substantially parallel and adjacent relation to one another. Growth media 24 is maintained within the elongated compartment 15 by plug element 25 to support and nourish the elongated root system 22 of the seedling 18. Due to the longitudinal dimension and overall configuration of the compartment 15, the root system 22 is allowed to grow in substantially vertically downward direction and obtain a length suited for proper growth of the seedling 18.

The embodiment of FIGS. 4 through 7 however includes a decorating means 34' in the form of an angel 40 having a hollow interior body which is dimensioned and configured to substantially enclose or encase at least a portion of the housing including a portion of the container means 14 and mounting means 16.

With regard to the embodiments of FIGS. 8 and 9, the housing includes a container means 14' and a mounting means 16' both disposed in substantially aligned, colinear relation to one another wherein plug 25 maintains the growth media 24 in surrounding and nourishing relation to the root system 22 of the seedling 18. The exposed portion 19 extends outwardly from the first opening 20 and from the growth media 24 maintained within the compartment 15. The longitudinal dimension and configuration of the compartment 15 is such as to allow growth of the aforementioned root system 22 in the vertically downward directed direction. The second opening 29 allows passage of the end 30 of the tree structure 12 within the hollow interior portion 28 such that the mounting means 16' is removably disposed in surrounding, substantially telescoping relation about the end 30 of the tree structure 12. In this embodiment, the decorating means is generally indicated as 34'' and includes a connecting means in the form of a connecting ring 48 having connecting apertures 49 in which are mounted branch replicas 50 which may be artificial representations of branch portions of the tree structure 12. Alternately, such branch portions may be live, freshly cut branch structures, but are interconnected to extend outwardly from the exterior of the housing including both the container means 14 and the mounting means 16 so as to add to the overall decoration thereof.

Yet another embodiment of the present invention comprises a stand or support 52 (see FIGS. 10 and 11) having base portion 54 which may be substantially planar and of sufficient dimension and overall configuration to support an end of the compartment means 14 associated with the plug element 25. The stand is provided to support the assembly 10 by virtue of its removable positioning of one end of the compartment means 14 within the interior of circular or annular flange 59 such that the assembly is in its upright normally display position when not mounted on a tree structure 12. Venting apertures 60 and 62 are formed respectively in the lower end of the compartment means 14 and the annular flange 59 wherein such apertures are aligned to permit venting of excess moisture from the lower end of the compartment means 14 through the porous, liquid permeable plug element 25. Further, an annular peripheral flange 64 may serve as a moisture retaining barrier to maintain any drained water on the exposed surface 54' of the base 54.

It is therefore to be understood that the following claims are intended to cover all of the generic and specific features of the present invention herein described, and all statements of the scope of the invention which, as a matter of language, might be said to fall therebetween.

Now that the invention has been described,
What is claimed is:

1. A container and mounting assembly designed for support and display of a seedling, primarily a containerized seedling-type plant on a tree structure, said assembly comprising:
   (a) a housing including a container means for containment and display of a live seedling plant therein and a mounting means for securing said housing to a tree structure,
   (b) said container means including a compartment being dimensioned and configured to maintain a growth media therein and accommodate a root system of the seedling therein,
   (c) said compartment including a longitudinal dimension sufficient to accommodate substantially vertically downward growth the seedling root system therein,
   (d) said compartment having a longitudinal dimension at least as great as an anticipated elongated dimension of the seedling root system necessary to foster growth without causing upturning of the root system within said compartment,
   (e) said mounting means disposed adjacent to said container means and comprising a substantially hollow interior portion dimensioned and configured to receive a trunk portion of the tree structure therein,
   (f) a first opening formed in said compartment and disposed and dimensioned for extension of the seedling outwardly therethrough from the interior of said compartment,
   (g) a second opening formed in said mounting means in communicating relation to said hollow interior portion and disposed and dimensioned for passage of the trunk portion therethrough into said hollow interior portion, said hollow interior portion of said mounting means having an end portion adjacent said first opening,
   (h) decoration means structured for asthetic enhancement of said housing and disposed to extend outwardly from said housing in a viewable, exposed orientation, and (i) said decoration means structured and configured for cooperative disposition relative to said first opening, the seedling extending outwardly in viewable relation to a front of said decoration means, whereby the seedling and said decoration means may be readily viewable simultaneously.

2. An assembly as in claim 1 wherein said container means comprises an elongated substantially tubular configuration, said first opening formed at one end thereof in adjacent, cooperative, substantially surrounded disposition relative to said decorating means, whereby the seedling is disposed in substantially aligned and combined relation to said decorating means.

3. An assembly as in claim 2 wherein said mounting means comprises a substantially tubular configuration and said hollow interior portion includes a longitudinal dimension sufficient to receive a distal portion of the trunk of the tree structure therein and along the length thereof, said second opening formed adjacent one end of said tubular configuration and disposed and dimensioned to allow passage of the distal portion therethrough.

4. An assembly as in claim 3 wherein said tubular mounting means is disposed in substantially parallel, coplanar relation to said tubular container means and the seedling is disposed in substantially side-by-side relation to the trunk portion of the tree structure.

5. An assembly as in claim 3 wherein said tubular mounting means is disposed in substantially aligned, colinear relation to said tubular container means and the seedling is disposed in substantially colinear, outwardly extending relation to the trunk portion of the tree structure.

6. An assembly as in claim 5 further comprising connecting means disposed on the exterior of said aligned container means and compartment means and structured for attachment of branch elements thereto.

7. An assembly as in claim 1 wherein said mounting means is disposed in substantially parallel, coplanar relation to said container means and the seedling is disposed in substantially side-by-side relation to the trunk portion of the tree structure.

8. An assembly as in claim 7 wherein said mounting means is disposed in substantially aligned, colinear relation to said container means and the seedling is disposed in substantially colinear, outwardly extending relation to the trunk portion of the tree structure.

9. An assembly as in claim 1 wherein said first opening is at least partially defined by a periphery disposed in substantially coplanar and contiguous relation to said decorating means, said decorating means at least partially angularly oriented relative to a longitudinal axis of said container means so as to define an exposed orientation of a display face thereof.

10. An assembly as in claim 9 wherein said decoration means comprises a substantially planar configuration including an exposed face thereof defining said display face, said decorating means being removably mounted on said housing.

11. An assembly as in claim 1 further comprising support means for supporting the housing when removed from the tree structure, said support means including a base having a substantially planar configuration and including a flange portion extending upwardly from an exposed surface of said base and configured and dimensioned to removably engage and at least partially surround a lower end of said compartment means; venting means formed in said flange portion for venting of excess liquid from said compartment, whereby said housing is maintained in an upright, normal display position when disassociated from the tree structure.

12. An assembly as in claim 1 wherein said container means is disposed to project through an exposed surface of said decoration means and oriented for positioning of the seedling in aligned and combined display with said decoration means.

13. An assembly as in claim 1 wherein said decorating means comprises an attachment assembly secured thereto for removable support of said decorating means on said housing, said attachment assembly disposed and structured for substantially sliding and embracing engagement with an exterior surface portion of said housing.

14. An assembly as in claim 1 further comprising a stopper element connected to a lower end portion of said container means and dimensioned to substantially fill said lower end portion of said container means and maintain growth media within said compartment.

15. An assembly as in claim 14 wherein said stopper element is structured to allow drainage of liquid from within said compartment to the exterior thereof.

16. An assembly as in claim 15 wherein said stopper element is formed from a substantially porous, liquid permeable material.

* * * * *